United States Patent
Van Wissen et al.

(10) Patent No.: US 10,217,464 B2
(45) Date of Patent: Feb. 26, 2019

(54) VOCABULARY GENERATION SYSTEM

(71) Applicant: KONINKLIJKE PHILIPS N.V., Eindhoven (NL)

(72) Inventors: Arlette Van Wissen, Culemborg (NL); Charlotte Dorothea Wilhelmina Vinkers, Eindhoven (NL); Aart Tijmen Van Halteren, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/593,918

(22) Filed: May 12, 2017

(65) Prior Publication Data

US 2017/0330567 A1  Nov. 16, 2017

Related U.S. Application Data

(60) Provisional application No. 62/336,044, filed on May 13, 2016.

(51) Int. Cl.
  *G10L 15/00* (2013.01)
  *G10L 15/06* (2013.01)
  (Continued)

(52) U.S. Cl.
  CPC .............. *G10L 15/22* (2013.01); *G06F 3/167* (2013.01); *G06F 17/279* (2013.01);
  (Continued)

(58) Field of Classification Search
  None
  See application file for complete search history.

(56) References Cited

U.S. PATENT DOCUMENTS 6,377,922 B2 * 4/2002 Brown ............... G10L 15/22
                                                     379/88.01
6,728,679 B1   4/2004 Strubbe
(Continued)

FOREIGN PATENT DOCUMENTS

WO   2015077398 A1   5/2015

OTHER PUBLICATIONS

Walker, Marilyn A. "An Application of Reinforcement Learning to Dialogue Strategy Selection in a Spoken Dialogue SYstem for Email", Journal of Artifical Intellignce Research, vol. 12, 2000, pp. 387-416.

*Primary Examiner* — Satwant K Singh

(57) ABSTRACT

Increasingly, conversational systems are used in coaching or supportive contexts, either in an embodied form (e.g., as an avatar in an app or website) or just in a speech-driven for (e.g. Siri). There is a need to keep such systems interesting and appealing over time in order to prevent the user from reducing use of the system or abandoning the system all together. The present system is configured to learn new expressions from user utterances and use them based on their predicted utility during interactions with the user. The present system includes components configured for learning new vocabulary and selecting vocabulary for generating new utterances from the system. This way, the system continually expands its vocabulary database with expressions familiar to and/or used by the user and will be able to engage the user with new utterances so that the user does not lose interest in the system.

18 Claims, 4 Drawing Sheets

(51) Int. Cl.
  *G10L 17/00*   (2013.01)
  *G10L 21/00*   (2013.01)
  *G10L 15/22*   (2006.01)
  *G06F 3/16*    (2006.01)
  *G06F 17/27*   (2006.01)
  *G06F 17/30*   (2006.01)

(52) U.S. Cl.
  CPC .... *G06F 17/2775* (2013.01); *G06F 17/30654* (2013.01); *G10L 2015/223* (2013.01)

(56) References Cited

U.S. PATENT DOCUMENTS

| | | |
|---|---|---|
| 6,766,320 B1 | 7/2004 | Wang |
| 6,950,793 B2 | 9/2005 | Ross |
| 7,054,817 B2 * | 5/2006 | Shao ........................ G10L 15/22 704/243 |
| 7,231,343 B1 | 6/2007 | Treadgold |
| 8,219,397 B2 | 7/2012 | Jaiswal |
| 8,812,319 B2 * | 8/2014 | Skerpac ................ G10L 17/005 704/246 |
| 2014/0074454 A1 | 3/2014 | Brown |

* cited by examiner

VOCABULARY GENERATION SYSTEM

CROSS-REFERENCE TO PRIOR APPLICATION

This application claims the benefit of U.S. Provisional Patent Application No. 62/336,044, filed May 13, 2016 which is incorporated by reference herein.

BACKGROUND

1. Field

The present disclosure pertains to a vocabulary generation system configured to interact with a user.

2. Description of the Related Art

Increasingly, conversational systems are used in coaching or supportive contexts, either in an embodied form (e.g., as an avatar in an app or web site) or in a speech-driven form (e.g. Siri). These systems typically include a static database of words or phrases used to engage a user. In these systems, the same static words and/or phrases are used over and over to respond to user questions and responses. Although the selection of specific words and/or phrases from the static database may be adaptive or dynamic, the set of words and/or phrases that may be selected is predefined and unchanging. There is a need to keep such systems interesting and appealing over time in order to prevent the user from reducing use of these systems or abandoning these systems all together.

SUMMARY

Accordingly, one or more aspects of the present disclosure relate to a vocabulary generation system configured to interact with a user. The system comprises one or more hardware processors and/or other components. The one or more hardware processors are configured by machine readable instructions to: pose a user prompt to the user, the user prompt selected from a set of possible user prompts having a common topic and/or similar meanings and/or expression values stored in an electronic database; receive an utterance from the user in response to the user prompt; identify names in the utterance, adjectives that express positive or negative sentiment in the utterance, and/or individual grammatical clauses in the utterance; reduce the utterance to a generalized form of the utterance based on the names, the adjectives, and/or the grammatical clauses; determine whether the generalized form of the utterance is already associated with the user prompt and/or topic in the electronic database; and responsive to a determination that the generalized form of the utterance is not already associated with the user prompt and/or topic in the electronic database, assign a utility value to the generalized form of the utterance and associate the generalized form of the utterance with the user prompt and/or topic in the electronic database; or responsive to a determination that the generalized form of the utterance is already associated with the user prompt and/or topic in the electronic database, update the utility value to indicate that the generalized form of the utterance has more utility.

The one or more hardware processors are further configured such that the set of possible user prompts is stored in the electronic database with associated utility values, and to update a utility value for the user prompt based on an appropriateness of the utterance. The one or more hardware processors are configured to determine the appropriateness of the utterance based on one or more of a timing of the user utterance following the prompt, whether the user asks for clarification after the prompt, filler language expressed by the user following the prompt, a negative valence of a next subsequent user utterance following the prompt, and/or other information. The one or more hardware processors are further configured to generate a response to the utterance by the user by: determining a system prompt and/or topic expressed in the utterance from the user; and selecting the response from a set of possible responses stored in the electronic database for the system prompt and/or topic in the utterance. The response is selected based on utility values assigned to individual ones of the responses in the set of possible responses. The one or more hardware processors are configured to update a utility value for the selected response based on an appropriateness of the response indicated by a next subsequent utterance by the user.

Another aspect of the present disclosure relates to a method for generating vocabulary with a generation system to facilitate interaction between the system and a user. The system comprises one or more hardware processors and/or other components. The method comprises posing a user prompt to the user, the user prompt selected from a set of possible user prompts having a common topic stored in an electronic database; receiving an utterance from the user in response to the user prompt; identifying names in the utterance, adjectives that express positive or negative sentiment in the utterance, and/or individual grammatical clauses in the utterance; reducing the utterance to a generalized form of the utterance based on the names, the adjectives, and/or the grammatical clauses; determining whether the generalized form of the utterance is already associated with the user prompt and/or topic in the electronic database; and responsive to a determination that the generalized form of the utterance is not already associated with the user prompt and/or topic in the electronic database, assigning a utility value to the generalized form of the utterance and associating the generalized form of the utterance with the user prompt and/or topic in the electronic database; or responsive to a determination that the generalized form of the utterance is already associated with the user prompt and/or topic in the electronic database, updating the utility value to indicate that the generalized form of the utterance has more utility.

The set of possible user prompts is stored (e.g., categorized by and/or associated with the common topic and/or meaning) in the electronic database with associated utility values. In some embodiments, the method further comprises updating a utility value for the user prompt based on an appropriateness of the utterance. The appropriateness of the utterance is determined based on one or more of a timing of a user utterance following the prompt, whether the user asks for clarification after the prompt, filler language expressed by the user following the prompt, a negative valence of a next subsequent user utterance following the prompt, and/or other information. In some embodiments, the method further comprises generating a response to the utterance by the user by: determining a system prompt and/or topic expressed in the utterance from the user; and selecting the response from a set of possible responses stored in the electronic database for the system prompt and/or topic in the utterance. The response is selected based on utility values assigned to individual ones of the responses in the set of possible responses. In some embodiments, the method further comprises updating a utility value for the selected response based on an appropriateness of the response indicated by a next subsequent utterance by the user.

Still another aspect of present disclosure relates to a vocabulary generation system configured to interact with a user. The system comprises means for posing a user prompt to the user, the user prompt selected from a set of possible user prompts having a common topic stored in an electronic database; means for receiving an utterance from the user in response to the user prompt; means for identifying names in the utterance, adjectives that express positive or negative sentiment in the utterance, and/or individual grammatical clauses in the utterance; means for reducing the utterance to a generalized form of the utterance based on the names, the adjectives, and/or the grammatical clauses; means for determining whether the generalized form of the utterance is already associated with the user prompt and/or topic in the electronic database; and means for, responsive to a determination that the generalized form of the utterance is not already associated with the user prompt and/or topic in the electronic database, assigning a utility value to the generalized form of the utterance and associating the generalized form of the utterance with the user prompt and/or topic in the electronic database; or means for, responsive to a determination that the generalized form of the utterance is already associated with the user prompt and/or topic in the electronic database, updating the utility value to indicate that the generalized form of the utterance has more utility.

The set of possible user prompts is stored in the electronic database with associated utility values. In some embodiments, the system further comprises means for updating a utility value for the user prompt based on an appropriateness of the utterance. The appropriateness of the utterance is determined based on one or more of a timing of a user utterance following the prompt, whether the user asks for clarification after the prompt, filler language expressed by the user following the prompt, a negative valence of a next subsequent user utterance following the prompt, and/or other information. In some embodiments, the system further comprises means for generating a response to the utterance by the user by: determining a system prompt and/or topic expressed in the utterance from the user; and selecting the response from a set of possible responses stored in the electronic database for the system prompt and/or topic in the utterance. The response is selected based on utility values assigned to individual ones of the responses in the set of possible responses. In some embodiments, the system further comprises means for updating a utility value for the selected response based on an appropriateness of the response indicated by a next subsequent utterance by the user.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY EMBODIMENTS

Figure 1:
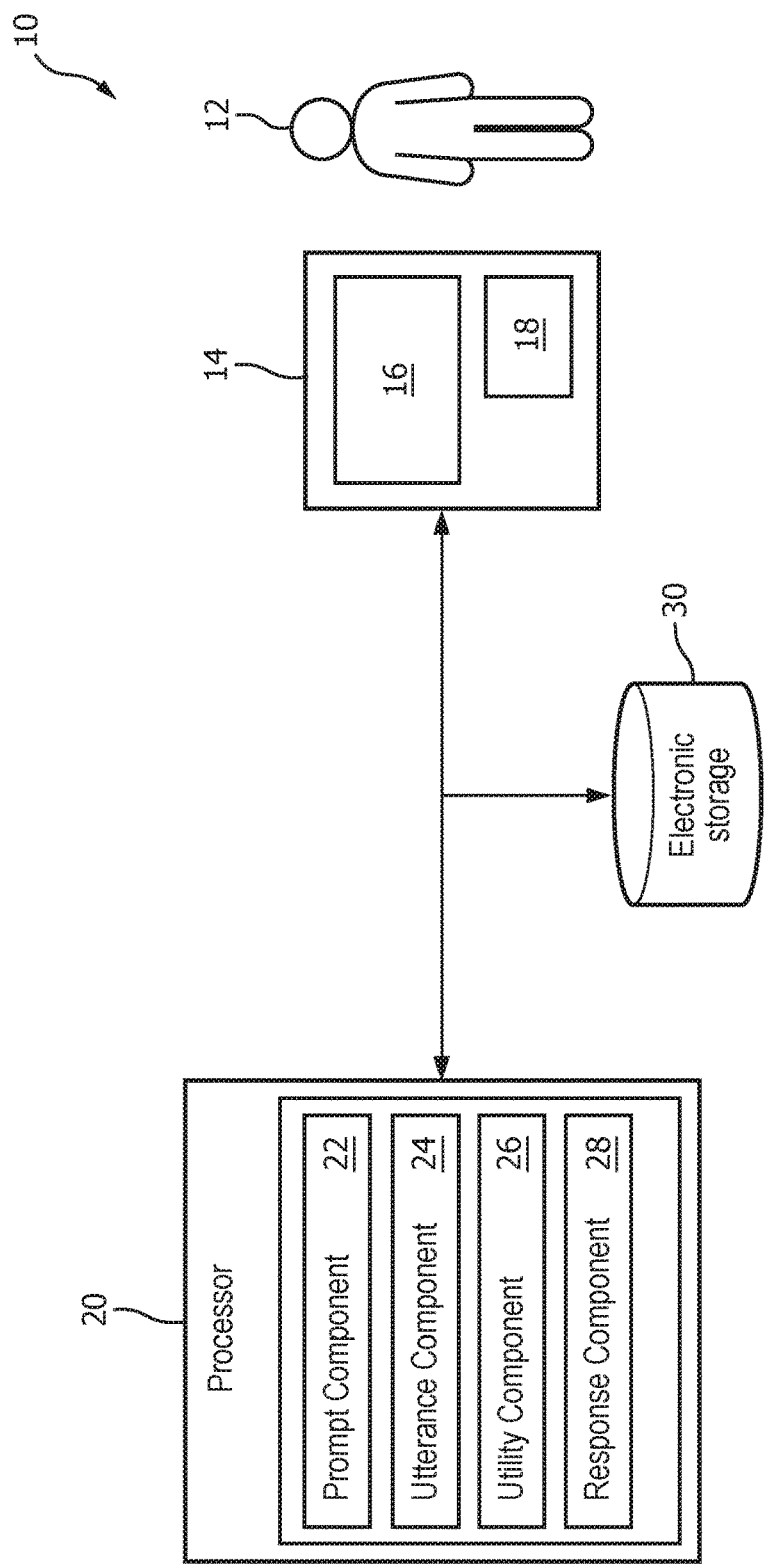
FIG. 1 is a schematic illustration of a vocabulary generation system configured to interact with a user.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

As used herein, the word "unitary" means a component is created as a single piece or unit. That is, a component that includes pieces that are created separately and then coupled together as a unit is not a "unitary" component or body. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 is a schematic illustration of a vocabulary generation system 10 configured to interact with a user 12. For a conversational system to remain engaging it needs to produce a subtle yet sufficient amount of variability in the prompts and responses that it produces. Prompts include words, phrases, and/or expressions used to start a conversation (e.g., hello, good morning, etc.) and/or otherwise cause user 12 to speak, and/or other prompts. Responses include words, phrases, questions, and/or expressions used by system 10 to respond to answers, statements, questions, and/or other communications from user 12. Variability in prompts and responses may be produced by having a large database of prompts and responses, but this has as a drawback in that all of the prompts and responses have to be pre-defined, which is neither scalable nor efficient. System 10 is configured to learn new words, phrases, and/or expressions from user 12 utterances and use them based on their predicted utility during interactions with user 12. It should be noted that the terms words, phrases, and/or expressions are not intended to be limiting. They are used herein to represent any understandable language and/or language features used by system 10 and/or user 12 for communication. Utterances include typed utterances, spoken utterances, a combination of both typed and spoken utterances, and/or other forms of communication from user 12.

System 10 includes components configured for learning new words, phrases, and/or expressions and selecting the newly learned words, phrases, and/or expressions when generating prompts and/or responses to utterances from user 12. This way, system 10 continually expands its word, phrase, and/or expression database with words, phrases, and/or expressions familiar to and/or used by user 12 and is able to engage and/or maintain the interest of user 12 over time with newly used utterances so that user 12 does not lose interest in system 10. Prompts and/or responses from system 10 to user 12 are more effective relative to communications from prior art systems because the information in the prompts and/or responses from system 10 is more likely to be absorbed when the cognitive effort needed to process the content of the communication is increased (e.g., because the communication is not filled with the same repetitive words and phrases user 12 has heard before). By way of a non-limiting example, if system 10 is used by a teenager it will adapt and use words, phrases, and expressions used by the teenager so that over time prompts and responses from system 10 will sound more and more like they came from the teenager herself.

System 10 has two phases of operation: learning of new words, phrases and/or expressions; and selection of words, phrases, and/or expression for use in prompts and/or responses to user 12. System 10 learns new words, phrases, and expressions by analyzing user 12 utterances in response to prompts and/or responses from system 10 during conversation with user 12 and storing the new words, phrases, and/or expressions for future use. For example, system 10 may analyze an utterance from user 12 to learn and store a new slang term used by user 12. System 10 then selects words, phrases, and/or expressions from previously known and newly learned alternatives that it deems most appropriate for a particular prompt and/or response, in which the appropriateness has been learned from previous interactions with user 12. In some embodiments, system 10 includes one or more of a user interface 14, a processor 20, electronic storage 30, and/or other components.

User interface 14 is configured to receive information from and/or provide information to one or more users (e.g., user 12) of system 10. User interface 14 is configured to provide an interface between system 10 and the users through which the users may provide information to and receive information from system 10. This enables data, cues, results, and/or instructions and any other communicable items, collectively referred to as "information," to be communicated between a user (e.g., user 12) and processor 20, and/or other components of system 10. For example, user 12 may converse with system 10 (described below) via user interface 14.

Examples of interface devices suitable for inclusion in user interface 14 comprise a display 16, a receiver 18, a graphical user interface, a touchscreen, a keypad, buttons, speakers, a microphone, switches, a keyboard, knobs, levers, an indicator light, an audible alarm, a printer, a haptic feedback device, and/or other interface devices. In some embodiments, user interface 14 comprises a plurality of separate interfaces (e.g., display 16, a keyboard, etc.). In some embodiments, user interface 14 comprises at least one interface that is provided integrally with processor 20 and/or other components of system 10. In some embodiments, display 16 displays the graphical user interface. In some embodiments, the graphical user interface presents an avatar and/or other graphical communication tools to user 12 to facilitate communication between system 10 and user 12. The avatar and/or other graphical communication tools may be controlled by processor 20. Receiver 18 is configured to receive utterances from user 12 and/or provide prompts and/or responses (e.g., as described below) from system 10 to user 12. In some embodiments, receiver 18 is configured to generate output signals that convey information in the utterances to processor 20 (e.g., convert the auditory and/or textual utterances to an electronic signal), and/or receive electronic signals from processor 20 and convert them to auditory and/or textual prompts and/or responses for communication to user 12. Receiver 18 may include the speakers, microphone and/or other sound receiving and/or sound providing equipment.

It is to be understood that other communication techniques, either hard-wired or wireless, are also contemplated by the present disclosure as user interface 14. For example, the present disclosure contemplates that user interface 14 may be integrated with a removable storage interface provided by electronic storage 30. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 comprise, but are not limited to, an RS-232 port, RF link, an IR link, modem (telephone, cable or other). In short, any technique for communicating information with system 10 is contemplated by the present disclosure as user interface 14.

Processor 20 is configured to provide information processing capabilities in system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., a server, a computing device associated with user 12 and/or other users, user interface 14, electronic storage 30, and/or other devices.)

As shown in FIG. 1, processor 20 is configured via machine-readable instructions to execute one or more computer program components. The one or more computer program components may comprise one or more of a prompt component 22, an utterance component 24, a utility component 26, a response component 28, and/or other components. Processor 20 may be configured to execute components 22, 24, 26, and/or 28 by software; hardware; firmware; some combination of software, hardware, and/or firmware; and/or other mechanisms for configuring processing capabilities on processor 20.

It should be appreciated that although components 22, 24, 26, and 28 are illustrated in FIG. 1 as being co-located within a single processing unit, in embodiments in which processor 20 comprises multiple processing units, one or more of components 22, 24, 26, and/or 28 may be located remotely from the other components (e.g., one or more components may be located within a server while one or more other components are located within a computing system associated with user 12). The description of the functionality provided by the different components 22, 24, 26, and/or 28 described below is for illustrative purposes, and is not intended to be limiting, as any of components 22, 24, 26, and/or 28 may provide more or less functionality than is described. For example, one or more of components 22, 24, 26, and/or 28 may be eliminated, and some or all of its functionality may be provided by other components 22, 24, 26, and/or 28. As another example, processor 20 may be configured to execute one or more additional components that may perform some or all of the functionality attributed below to one of components 22, 24, 26, and/or 28.

Prompt component 22 is configured to pose a user prompt to user 12 (e.g., by controlling the avatar to speak to user 12 via user interface 14). The user prompt is selected by prompt component 22 from sets of possible user prompts having common topics stored in an electronic database (e.g., electronic storage 30). The common topics may be indicated by keywords, expected question-answer or input-response pairs, and/or other indications. For example, prompt component 22 may select a prompt from a set of prompts meant to welcome (e.g., the common topic would be welcome in this example) user 12. The set of possible user prompts is stored in the electronic database with associated utility values. The associated utility values indicate a usefulness and/or appropriateness (e.g., as described below) of the possible prompts. In some embodiments, the electronic database includes sets of possible responses to user 12 utterances and their associated utility values. In some embodiments, the possible user prompts, the possible responses, and/or the associated utility values stored in the electronic database are determined at manufacture (e.g., pre-programmed in system 10), determined based on previous and/or current (e.g., as described below) interactions with user 12 and/or other users, and/or determined by other methods. By way of a non-limiting example, Table I below illustrates three topics (e.g., "Welcome", "Ask Mood", and "Clarification), possible prompts and/or responses that may be selected by system 10 for the different topics, and utility values for the possible prompts and/or responses.

TABLE I

| Topic | Prompt/Response | Utility |
|---|---|---|
| Welcome | Hi <NAME>! | 0.5 |
|  | Hello <NAME>. | 0.5 |
|  | A good morning to you. | 0.5 |
| Ask mood | How are you doing today? | 0.5 |
|  | How are you feeling today? | 0.8 |
|  | How's it going, love? | 0.4 |
|  | Whazzup?! | 0.3 |
| Clarification | What do you mean? | 1 |
|  | Could you rephrase that? | 0.5 |
|  | Say what now? | 0.3 |

Utterance component 24 is configured to receive an utterance from user 12 (e.g., via user interface 14) in response to the user prompt and store the utterance in the electronic database. As described above, the utterance may be spoken, typed and/or communicated to system 10 is some other form. In some embodiments, if the utterance is spoken, utterance component 24 is configured to convert the speech to text for analysis. For example, utterance component 24 may include and/or use state of the art proprietary speech recognition software such as Nuance Dragon and Chrome Speech API, or open source software such as Kaldi or CMU Sphinx and/or other software to convert the speech to text. Analysis by utterance component 24 comprises syntactic, semantic, and/or other analysis of the utterance and annotating the utterance based on the analysis. The syntactic and/or semantic analysis and annotation of the utterance may be similar to and or the same as syntactic and/or semantic analysis and annotation performed. Semantic annotation and analysis can be done for example by a simple bag of words approach, or by using existing software packages such as Gensim or NLTK (freeware). Syntactic annotation can be done with existing software packages such as LibShortText or with data mining packages such as Pattern or NLTK. Based on the analysis, utterance component 24 is configured to identify names in the utterance, adjectives that express positive or negative sentiment in the utterance, individual grammatical clauses in the utterance (e.g., based on punctuation), and/or other information in or features of the utterance.

Utterance component 24 is configured to reduce the utterance to a generalized form of the utterance based on the analysis (e.g., based on the names, the adjectives, and/or the grammatical clauses). The generalized form of the utterance is re-useable by system 10 in later prompts and/or responses to user 12. In some embodiments, the annotations from the analysis are used to, for example, create variables for names, store sentences with adjectives according to the sentiment they express, to remove clauses, and/or for other purposes.

For example, if user 12 utters "Alex" in response to a prompt of "what is your name?" from prompt component 22, a syntax annotation may facilitate reducing the utterance to an empty string by utterance component 24, because the utterance has no structure that can be re-used by system 10. As another example, if user 12 utters "my name is Alex", the utterance is reduced and stored as "my name is <VAR>". As a third example, if user 12 utters "I am Alex, idiot", an annotation may facilitate filtering out negative words or adjectives (e.g., "idiot"), and/or splitting sentences based on punctuation. This would leave "I am <VAR>" as the reduced generalized form of the utterance in this example. System 10 may reuse this same syntactical structure in later prompts and/or responses to user 12, for example.

The generalized forms of the utterances are stored in the electronic database. In some embodiments, system 10 (e.g., electronic storage 30) is configured such that other related systems may access this database. This way, the related systems also have access to new words, phrases, and/or expressions that have been learned by a plurality of systems for a population of users.

Utility component 26 is configured to determine whether the generalized form of the utterance is already associated with the user prompt and/or topic in the electronic database. Responsive to a determination that the generalized form of the utterance is not already associated with the user prompt and/or topic in the electronic database, utility component 26 is configured to assign a utility value to the generalized form of the utterance and associate the generalized form of the utterance with the user prompt and/or topic in the electronic database. Responsive to a determination that the generalized form of the utterance is already associated with the user prompt and/or topic in the electronic database, utility component 26 is configured to update the utility value to indicate that the generalized form of the utterance has more utility.

In some embodiments, the assigned and/or updated utility values may be associated with a utility scale having a minimum value of zero and a maximum value of one (this is not intended to be limiting), and/or on other utility scales. In some embodiments, utility values initially assigned to new utterances may be set at manufacture, set by user 12 and/or other users (e.g., via user interface 14), determined based on previous interactions between system 10 and user 12, and/or determined in other ways. In some embodiments, a utility value initially assigned to a new utterance may be the mid-point of the utility scale (e.g., 0.5 in the example given above). In some embodiments, the utility values may be adjusted by predetermined amounts (e.g., an absolute amount, a percentage of a current utility value, etc.) and/or other amounts. The predetermined amounts may be set at manufacture, set by user 12 and/or other users (e.g., via user interface 14), determined based on previous interactions between system 10 and user 12, and/or determined in other ways. By way of a non-limiting example, if utility component 26 determines that the generalized form of an utterance is not yet associated with the corresponding prompt posed by prompt component 22 (e.g., user 12 said something new in response to this prompt), there is not yet a known utility for this generalized utterance. In this case, utility component 26 is configured to associate and store the generalized form of the utterance with the corresponding prompt, and assign the generalized form of the utterance a utility value of 0.5 (for example). If utility component 26 determines that the same generalized utterance for the posed prompt already exists in the database, utility component 26 is configured to increase the utility value of the generalized utterance. In this example, the utility value may be increased by a percentage (for example 5% of the current utility value, where the utility value can range between 0-1).

Utility component 26 is configured to update a utility value for the user prompt based on an appropriateness of the utterance. In some embodiments, updating the utility value includes increasing the utility value, decreasing the utility value, and/or other updating of the utility value. Utility component 26 is configured to determine the appropriateness of the utterance based on one or more of a timing of a user utterance following the prompt, whether the user asks for clarification after the prompt, filler language expressed by the user following the prompt, a negative valence of a next subsequent user utterance following the prompt, and/or other information conveyed by the utterance. For example, utility component 26 may increase a utility value responsive to a timing of a user utterance following the prompt being short, the user not needing to ask for clarification after the prompt, no filler language expressed by the user following the prompt, and/or a positive valence of a next subsequent user utterance following the prompt. Utility component 26 may decrease a utility value responsive to a timing of a user utterance following the prompt being long (e.g., indicating user 12 confusion by the prompt), the user needing to ask for clarification after the prompt, filler language expressed by the user following the prompt (again, for example, indicating possible confusion), and/or a negative valence of a next subsequent user utterance following the prompt.

Response component 28 is configured to generate a response to the utterance by user 12. Response component 28 is configured to generate the response by determining a system prompt and/or topic expressed in the utterance from the user and selecting the response from a set of possible responses stored in the electronic database for the system prompt and/or topic in the utterance. The response is selected based on utility values assigned to individual ones of the responses in the set of possible responses. In some embodiments, response component 28 and prompt component 22 are configured such that responses generated by system 10 and/or the process for generating responses may be similar to and/or the same as the prompts generated by system 10 and/or the process for posing prompts to user 12.

When response component 28 is required to generate a response (e.g. after a user 12 utterance such as a statement or a question), response component 28 looks up, using a classifier with confidence score, the relevant system prompt and/or topic expressed in the utterance in the electronic database stored by electronic storage 30. For instance, multiclass classifications can be used to interpret the user input and classify it as belonging to one of the topics (the one with the highest confidence level, as the user input can be ambiguous or hard to match with the known topics). Initially, the set of possible responses includes pre-programmed default responses which do not have a known utility (e.g., so they would be stored with a utility value of 0.5 according to the example above). When asked for a response, the response component 28 picks from the set of possible responses using a weighted random function of the utility (as indicated by the utility values) of the responses. This function randomly returns one response, taking into account the utility values of the possible responses. This results in responses with higher utility values being more likely to be selected than responses with lower utility values. For example, a response with a utility value of 0.1 is less likely to be selected than a response with a utility value of 0.8.

Utility component 26 is then configured to update a utility value for the selected response based on an appropriateness of the response indicated by a next subsequent utterance by the user. Like the appropriateness of the prompt, the appropriateness of the response is determined based on one or more of a timing of a user utterance following the response, whether the user asks for clarification after the response, filler language expressed by the user following the response, a negative valence of a next subsequent user utterance following the response, and/or other information conveyed by the next subsequent utterance. This process of responding and updating the utility values associated with the responses may repeat as many times as necessary as user 12 and system 10 interact.

By way of a non-limiting example, Table II shown below illustrates the operations performed by processor 20. In this example, system 10 may be intended to work with a user (e.g. user 12) for six months (for example) to improve his/her medication adherence. The main interface is with an avatar/virtual coach (Eve) displayed by user interface 14 and controlled by processor 20, who can speak to the user (Adam) and process spoken input from the user. Trust in system 10 is strengthened by the relationship between the user and the virtual coach/avatar. In this example, processor 20 controls the virtual coach/avatar to check (e.g., by posing prompts and then responding) to see how the user is doing once every day. In this conversation the virtual coach/avatar has as a goal to know the user status with respect to his mood.

TABLE II

| Speaker | Selection | Prompt/ Utterance/ Response | Process Response | Update Utility Value |
|---|---|---|---|---|
| Eve | Select prompt from database with topic welcome, all have utility 0.5 so randomly pick. | Hi Adam! | | |
| Adam | | 'Morning sunshine | Utterance not found. Store with utility 0.5 under topic 'welcome'. | Update prompt utility 'Hi <NAME>' with +0.1 to 0.6 |

TABLE II-continued

| Speaker | Selection | Prompt/ Utterance/ Response | Process Response | Update Utility Value |
|---|---|---|---|---|
| Eve | Select response with random weighing function from topic 'ask mood' | Whazzup?! | | |
| Adam | | Um . . . What do you mean? | Utterance found in 'clarification', Update response with 0.1 to 1 (max) | Identified filler 'um' using annotation software. Update response utility 'Whazzup?!' by decreasing from 0.2 to 0.1 (e.g., or 0.1 to 0.0 etc.) |

Electronic storage 30 comprises electronic storage media that electronically stores information. The electronic storage media of electronic storage 30 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 30 may be (in whole or in part) a separate component within system 10, or electronic storage 30 may be provided (in whole or in part) integrally with one or more other components of system 10 (e.g., user interface 14, processor 20, etc.). In some embodiments, electronic storage 30 comprises a plurality of non-transient storage devices. For example, some or all of electronic storage 30 may be located in a server together with processor 20, in a computing device associated with user 12 together with processor 20 and/or user interface 14, and/or in other locations. The central servers may include additional information relevant for a large portion of (e.g., all) users of the system, such as coaching strategies, interruption protocols, or threshold values about patient measurements that trigger human coaches if they are exceeded. Electronic storage 30 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 30 may store software algorithms, information determined by processor 20, information received via user interface 14 and/or external computing systems, and/or other information that enables system 10 to function as described herein.

Figure 2:
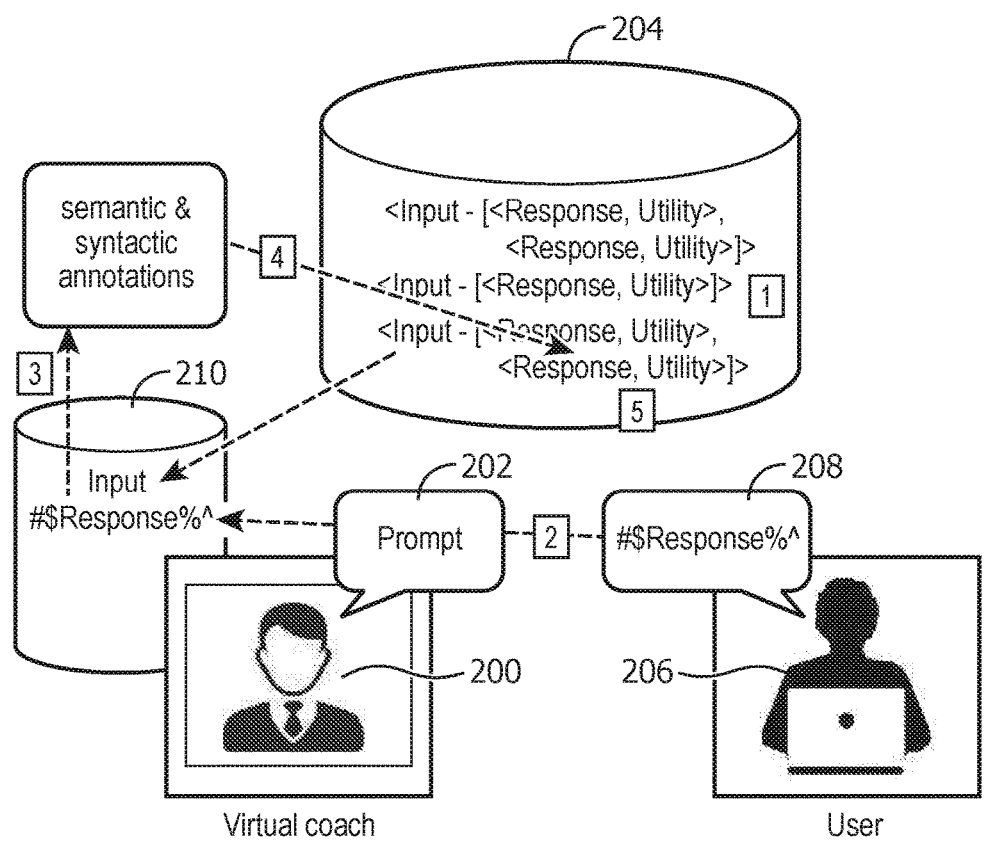
FIG. 2 summarizes steps in a learning phase of operation of the system.

FIG. 2 summarizes steps in the learning phase of operation of system 10 (shown in FIG. 1). At step 1, the virtual coach/avatar 200 (e.g., presented on a display and controlled by prompt component 22) poses a prompt 202 from a pre-coded set of prompts stored in a central database 204 to a user 206. Local database 210 stores information related to the relationship between an input (e.g., the prompt from the virtual coach) and the associated response from user 206. At step 2, the system stores the answer 208 given by user 206 in local database 210. Answer 208 can be given through speech and/or text/typing, for example. At step 3, answer 208 is analyzed both syntactically and semantically and annotated accordingly. At step 4, answer 208 is reduced to a generalized form that can be re-used by the system. The annotations from step 3 are used, for example as described above, to create variables for names, to store sentences with adjectives according to the sentiment they express, and/or to remove clauses. At step 5, the generalized answer form ('response') is stored in central database 204, which can be accessed by other systems. If this is a new response for that prompt ('input'), there is not yet a known utility. The response is stored and assigned a utility value of 0.5. If the same response for that input exists in the database, its utility is increased by a percentage (for example 5% of utility value, where the value ranges between 0-1). A new instance of this response is not added to the database.

Figure 3:
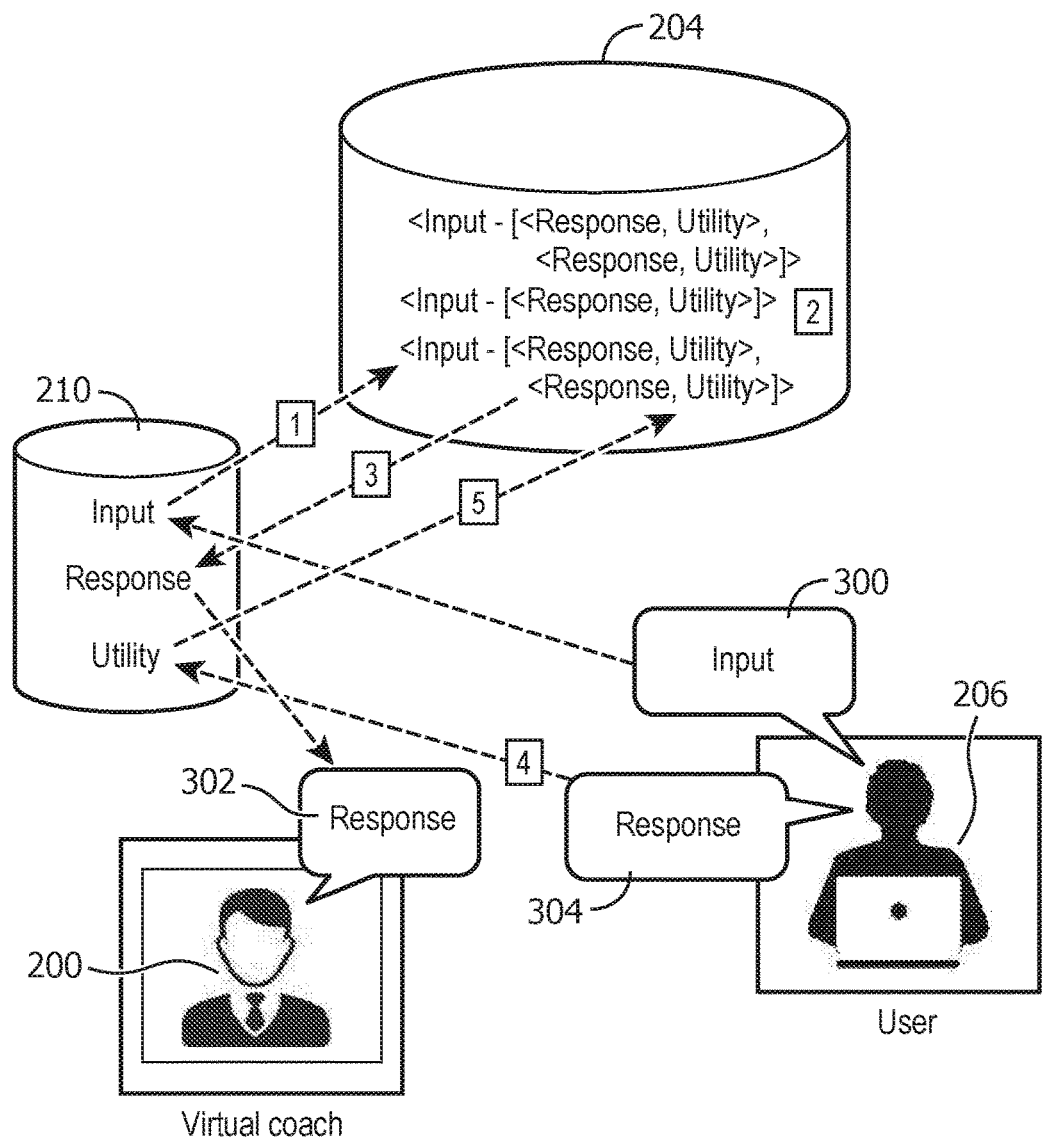
FIG. 3 summarizes steps in a selection phase of operation of the system.

FIG. 3 summarizes steps in a selection phase of operation of the system. When virtual coach/avatar 200 is required to give a response (after a user 206 utterance 300 such as a statement or question ('input')), the system looks up the relevant subject/question under 'input' in central database 204. As shown in step 2, the possible responses to the relevant subject/question have an associated utility value. At step 3, the system picks from the possible responses using a weighted random function of the utility values of the responses. As described above, this function randomly returns one response 302 such that a response with a lower utility value is less likely to be selected than a response with a higher utility value. At step 4, the utility value for the selected response is updated (e.g., as described above) based on the user interaction 304 following response 302. At step 5, the updated utility is stored in central database 204 with the selected response.

Figure 4:
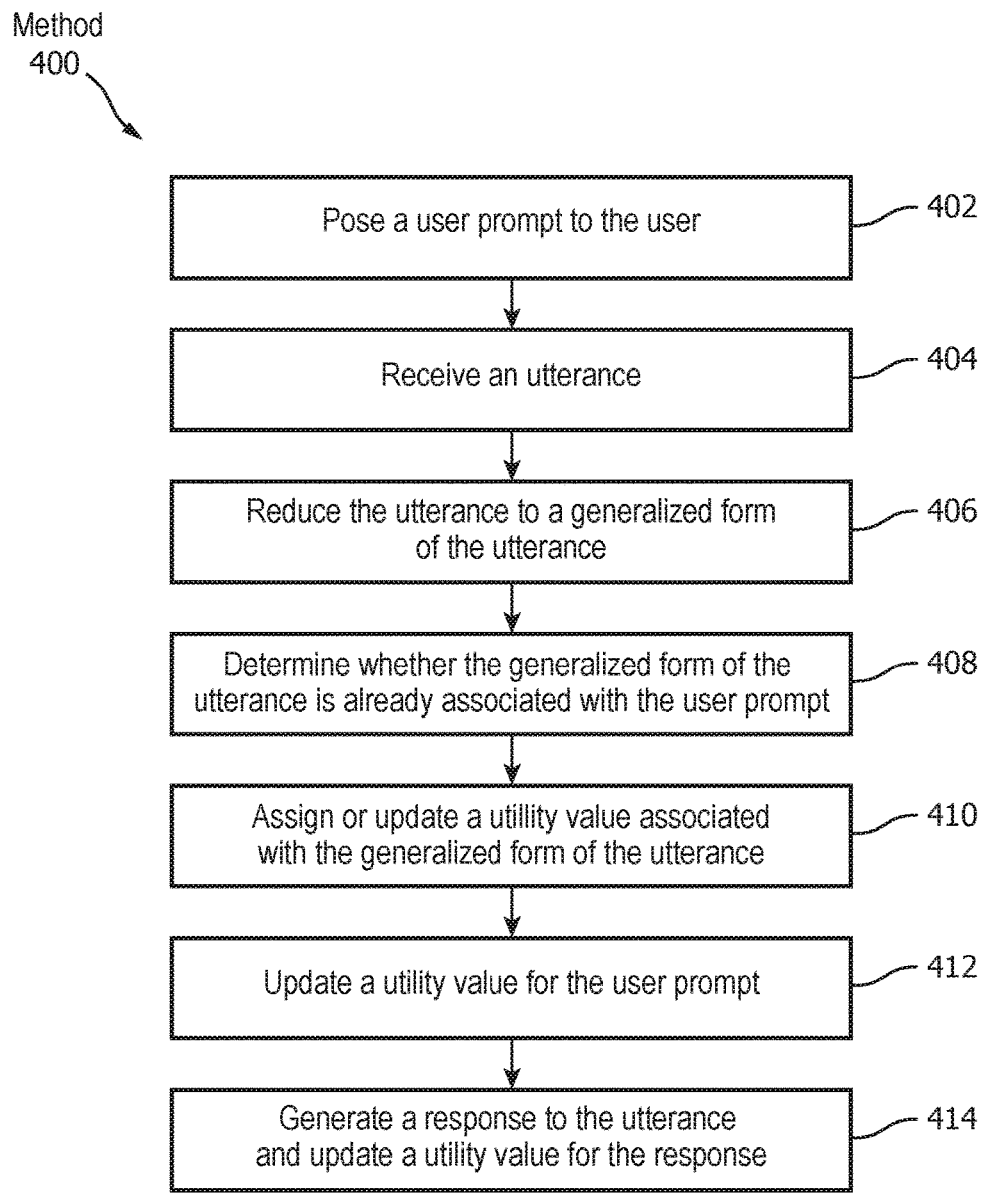
FIG. 4 illustrates a method for generating vocabulary with a generation system to facilitate interaction between the system and a user.

FIG. 4 illustrates a method 400 for generating vocabulary with a generation system to facilitate interaction between the system and a user. The system comprises one or more hardware processors and/or other components. The one or more hardware processors are configured by machine readable instructions to execute computer program components. The computer program components comprise a prompt component, an utterance component, a utility component, a response component, and/or other components. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a user prompt is posed to the user. The user prompt is selected from a set of possible user prompts having a common topic stored in an electronic database. In some embodiments, operation 402 is performed by a processor component the same as or similar to prompt component 22 (shown in FIG. 1 and described herein).

At an operation 404, an utterance is received from the user. The utterance from the user is in response to the prompt from the system. In some embodiments, the utterance may be typed or spoken, or some combination of both. In some embodiments, operation 404 is performed by a processor component the same as or similar to utterance component 24 (shown in FIG. 1 and described herein).

At an operation 406, the utterance is reduced to a generalized form of the utterance. Reducing the utterance to a generalized form of the utterance includes identifying names in the utterance, adjectives that express positive or negative sentiment in the utterance, individual grammatical clauses in the utterance, and/or other information. The utterance is reduced to the generalized form based on the names, the adjectives, the grammatical clauses, and/or the other information. In some embodiments, operation 406 is performed by a processor component the same as or similar to utterance component 24 (shown in FIG. 1 and described herein).

At an operation 408, a determination of whether the generalized form of the utterance is already associated with the user prompt and/or topic in the database is made. In some embodiments, operation 408 is performed by a processor component the same as or similar to utility component 26 (shown in FIG. 1 and described herein).

At an operation 410, a utility value associated with the generalized form of the utterance is assigned or updated. Responsive to a determination that the generalized form of the utterance is not already associated with the user prompt and/or topic in the electronic database, a utility value is newly assigned to the generalized form of the utterance the generalized form of the utterance is associated with the user prompt and/or topic in the electronic database. Responsive to a determination that the generalized form of the utterance is already associated with the user prompt and/or topic in the electronic database, the utility value is updated to indicate that the generalized form of the utterance has more utility. In some embodiments, operation 410 is performed by a processor component the same as or similar to utility component 26 (shown in FIG. 1 and described herein).

At an operation 412, a utility value for the user prompt is updated. In some embodiments, the set of possible user prompts is stored in the electronic database with associated utility values. Operation 412 comprises updating a utility value for the user prompt based on an appropriateness of the utterance. In some embodiments, determining the appropriateness of the utterance is based on one or more of a timing of a user utterance following the prompt, whether the user asks for clarification after the prompt, filler language expressed by the user following the prompt, a negative valence of a next subsequent user utterance following the prompt, and/or other information. In some embodiments, operation 412 is performed by a processor component the same as or similar to utility component 26 (shown in FIG. 1 and described herein).

At an operation 414, a response to the utterance is generated and a utility value of the response is updated. The response to the utterance by the user is generated by: determining a system prompt and/or topic expressed in the utterance from the user; and selecting the response from a set of possible responses stored in the electronic database for the system prompt and/or topic in the utterance. The response is selected based on utility values assigned to individual ones of the responses in the set of possible responses. Updating the utility value for the selected response is based on an appropriateness of the response indicated by a next subsequent utterance by the user. In some embodiments, operation 414 is performed by processor components the same as or similar to utility component 26 and/or response component 28 (shown in FIG. 1 and described herein).

In some embodiments, one or more of operations 402 to 414 may include displaying, with a physical display (e.g., display 16 shown in FIG. 1), a graphical user interface configured to present an avatar to the user to facilitate communication with the user. The avatar is controlled to pose the user prompt, the response, and/or other information to the user. In some embodiments, one or more of operations 402 to 414 may include receiving, with a receiver (e.g., receiver 18 shown in FIG. 1) comprising a microphone, the utterance from the user and generating output signals that convey the names in the utterance, the adjectives that express positive or negative sentiment in the utterance, and/or the individual grammatical clauses in the utterance. In some embodiments, one or more of operations 402 to 414 may include storing, with non-transient electronic storage (e.g. electronic storage 30 shown in FIG. 1) comprising the electronic database that is part of the system, the prompt, the generalized form of the utterance, the response, the utility values, and/or other information.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to interact with a user, the system comprising one or more hardware processors configured by machine readable instructions to:
   pose a user prompt to the user, the user prompt selected from a set of possible user prompts having a common topic stored in an electronic database;
   receive an utterance from the user in response to the user prompt;

identify names in the utterance, adjectives that express positive or negative sentiment in the utterance, and/or individual grammatical clauses in the utterance;

reduce the utterance to a generalized form of the utterance based on the names, the adjectives, and/or the individual grammatical clauses; determine whether the generalized form of the utterance is already associated with the user prompt in the electronic database; and responsive to a determination that the generalized form of the utterance is not already associated with the user prompt in the electronic database, assign a utility value to the generalized form of the utterance and associate the generalized form of the utterance with the user prompt in the electronic database; or responsive to a determination that the generalized form of the utterance is already associated with the user prompt in the electronic database, update the utility value to indicate that the generalized form of the utterance has more utility.

2. The system of claim 1, wherein the one or more hardware processors are further configured such that the set of possible user prompts is stored in the electronic database with associated utility values, and wherein the one or more hardware processors are configured to update the utility value for the user prompt based on an appropriateness of the utterance.

3. The system of claim 2, wherein the one or more hardware processors are configured to determine the appropriateness of the utterance based on one or more of a timing of the utterance following the user prompt, whether the user asks for clarification after the user prompt, filler language expressed by the user following the user prompt, or a negative valence of a next subsequent user utterance following the user prompt.

4. The system of claim 1, wherein the one or more hardware processors are further configured to: generate a response to the utterance by the user by: determining a system prompt and/or topic expressed in the utterance from the user; and selecting the response from a set of possible responses stored in the electronic database for the system prompt and/or topic in the utterance, the response selected based on utility values assigned to individual ones of the responses in the set of possible responses; and update a utility value for the selected response based on an appropriateness of the selected response indicated by a next subsequent utterance by the user.

5. The system of claim 1, wherein the one or more hardware processors are configured such that the utterance is one or more of typed or spoken.

6. The system of claim 1, further comprising:
a physical display comprising a graphical user interface configured to present an avatar to the user to facilitate communication with the user, the avatar controlled by the one or more hardware processors to pose the user prompt; a receiver comprising a microphone configured to receive the utterance from the user and generate output signals that convey the names in the utterance, the adjectives that express positive or negative sentiment in the utterance, and/or the individual grammatical clauses in the utterance; and non-transient electronic storage comprising the electronic database.

7. A method for generating vocabulary with a system to facilitate interaction between the system and a user, the system comprising one or more hardware processors, the method comprising:

posing a user prompt to the user, the user prompt selected from a set of possible user prompts having a common topic stored in an electronic database;

receiving an utterance from the user in response to the user prompt;

identifying names in the utterance, adjectives that express positive or negative sentiment in the utterance, and/or individual grammatical clauses in the utterance;

reducing the utterance to a generalized form of the utterance based on the names, the adjectives, and/or the individual grammatical clauses;

determining whether the generalized form of the utterance is already associated with the user prompt in the electronic database; and responsive to a determination that the generalized form of the utterance is not already associated with the user prompt in the electronic database, assigning a utility value to the generalized form of the utterance and associating the generalized form of the utterance with the user prompt in the electronic database; or responsive to a determination that the generalized form of the utterance is already associated with the user prompt in the electronic database, updating the utility value to indicate that the generalized form of the utterance has more utility.

8. The method of claim 7, wherein the set of possible user prompts is stored in the electronic database with associated utility values, and wherein the method further comprises:
updating the utility value for the user prompt based on an appropriateness of the utterance.

9. The method of claim 8, further comprising:
determining the appropriateness of the utterance based on one or more of a timing of the utterance following the user prompt, whether the user asks for clarification after the user prompt, filler language expressed by the user following the user prompt, or a negative valence of a next subsequent user utterance following the user prompt.

10. The method of claim 7, further comprising:
generating a response to the utterance by the user by: determining a system prompt and/or topic expressed in the utterance from the user; and selecting the response from a set of possible responses stored in the electronic database for the system prompt and/or topic in the utterance, the response selected based on utility values assigned to individual ones of the responses in the set of possible responses; and updating a utility value for the selected response based on an appropriateness of the selected response indicated by a next subsequent utterance by the user.

11. The method of claim 7, wherein the utterance is one or more of typed or spoken.

12. The method of claim 7, further comprising:
displaying, with a physical display that is part of the system, a graphical user interface configured to present an avatar to the user to facilitate communication with the user, the avatar controlled to pose the user prompt; receiving, with a receiver comprising a microphone that is part of the system, the utterance from the user and generating output signals that convey the names in the utterance, the adjectives that express positive or negative sentiment in the utterance, and/or the individual grammatical clauses in the utterance; and storing, with non-transient electronic storage comprising the electronic database that is part of the system, the user prompt, the generalized form of the utterance, and the utility value.

13. A system configured to interact with a user, the system comprising:
   means for posing a user prompt to the user, the user prompt selected from a set of possible user prompts having a common topic stored in an electronic database;
   means for receiving an utterance from the user in response to the user prompt;
   means for identifying names in the utterance, adjectives that express positive or negative sentiment in the utterance, and/or individual grammatical clauses in the utterance;
   means for reducing the utterance to a generalized form of the utterance based on the names, the adjectives, and/or the individual grammatical clauses;
   means for determining whether the generalized form of the utterance is already associated with the user prompt in the electronic database; and
   means for, responsive to a determination that the generalized form of the utterance is not already associated with the user prompt in the electronic database, assigning a utility value to the generalized form of the utterance and associating the generalized form of the utterance with the user prompt in the electronic database; or
   means for, responsive to a determination that the generalized form of the utterance is already associated with the user prompt in the electronic database, updating the utility value to indicate that the generalized form of the utterance has more utility.

14. The system of claim 13, wherein the set of possible user prompts is stored in the electronic database with associated utility values, and wherein the system further comprises means for updating the utility value for the user prompt based on an appropriateness of the utterance.

15. The system of claim 14, further comprising
   means for determining the appropriateness of the utterance based on one or more of a timing of the utterance following the user prompt, whether the user asks for clarification after user the prompt, filler language expressed by the user following the user prompt, or a negative valence of a next subsequent user utterance following the user prompt.

16. The system of claim 13, further comprising:
   means for generating a response to the utterance by the user by: determining a system prompt and/or topic expressed in the utterance from the user; and selecting the response from a set of possible responses stored in the electronic database for the system prompt and/or topic in the utterance, the response selected based on utility values assigned to individual ones of the responses in the set of possible responses; and
   means for updating a utility value for the selected response based on an appropriateness of the selected response indicated by a next subsequent utterance by the user.

17. The system of claim 13, wherein the utterance is one or more of typed or spoken.

18. The system of claim 13, further comprising:
   means for displaying a graphical user interface configured to present an avatar to the user to facilitate communication with the user, the avatar controlled to pose the user prompt;
   means for receiving the utterance from the user and generating output signals that convey the names in the utterance, the adjectives that express positive or negative sentiment in the utterance, and/or the individual grammatical clauses in the utterance; and
   means for storing the user prompt, the generalized form of the utterance, and the utility value.

* * * * *